United States Patent
Nishida

(10) Patent No.: US 7,843,186 B2
(45) Date of Patent: Nov. 30, 2010

(54) SWITCHING REGULATOR HAVING HIGH SPEED RESPONSE

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 410 days.

(21) Appl. No.: 11/656,441

(22) Filed: Jan. 23, 2007

(65) Prior Publication Data
US 2007/0176588 A1    Aug. 2, 2007

(30) Foreign Application Priority Data
Jan. 25, 2006    (JP)    ............... 2006-016680

(51) Int. Cl.
G05F 1/575 (2006.01)
G05F 1/595 (2006.01)
G05F 1/613 (2006.01)

(52) U.S. Cl. ............... 323/284; 323/222; 323/271; 323/282

(58) Field of Classification Search ......... 323/222, 323/271, 281–290
See application file for complete search history.

(56) References Cited

U.S. PATENT DOCUMENTS

| | | | |
|---|---|---|---|
| 5,568,044 A * | 10/1996 | Bittner | 323/272 |
| 5,670,865 A * | 9/1997 | Farwell | 323/285 |
| 6,577,109 B2 * | 6/2003 | Dancy et al. | 323/272 |
| 6,690,755 B1 * | 2/2004 | Pulvirenti et al. | 375/350 |
| 6,885,175 B2 * | 4/2005 | Mihalka | 323/282 |
| 6,969,981 B1 * | 11/2005 | Fairbanks et al. | 323/299 |
| 7,019,507 B1 * | 3/2006 | Dittmer et al. | 323/284 |
| 7,180,274 B2 * | 2/2007 | Chen et al. | 323/222 |
| 7,385,379 B2 * | 6/2008 | Aioanei | 323/284 |
| 2003/0016000 A1 * | 1/2003 | Sanchez | 323/284 |
| 2004/0004470 A1 * | 1/2004 | Yoshida et al. | 323/284 |
| 2005/0077882 A1 * | 4/2005 | Nishino | 323/222 |
| 2006/0022653 A1 * | 2/2006 | Reed et al. | 323/282 |

FOREIGN PATENT DOCUMENTS

| | | |
|---|---|---|
| JP | 11-089222 | 3/1999 |
| JP | 2002-300774 | 10/2002 |

* cited by examiner

Primary Examiner—Jeffrey L Sterrett
Assistant Examiner—Fred E Finch, III
(74) Attorney, Agent, or Firm—Dickstein Shapiro LLP

(57) ABSTRACT

A step-down switching regulator that converts an input voltage to a predetermined lower output voltage which includes a first switch, an inductor, a second switch, a controller, and a detector to detect a proportional voltage of the output voltage and to output detection results to the controller when the proportional voltage exceeds a first predetermined reference voltage or falls below a second predetermined reference voltage which is lower than the first predetermined reference voltage. The controller shuts the first switch off when the proportional voltage exceeds the first predetermined reference voltage and shuts the second switch off when the proportional voltage falls below the second predetermined reference voltage.

14 Claims, 5 Drawing Sheets

SWITCHING REGULATOR HAVING HIGH SPEED RESPONSE

CROSS-REFERENCE TO RELATED APPLICATIONS

This patent application claims priority to Japanese patent application, No. 2006-016680 filed on Jan. 25, 2006 in the Japan Patent Office, the entire contents of which are incorporated by reference herein.

FIELD OF THE INVENTION

This patent specification describes a switching regulator, and more particularly a switching regulator having high speed response.

BACKGROUND

Recently, energy-saving has been actively promoted for environmental measures. For portable equipment using a battery, such as a mobile phone, a digital camera, and so on, it is especially important to establish energy savings to have a longer battery life. Such portable equipment widely uses a step-down type switching regulator which includes an inductor because it has a high efficiency and a capability to make it compact.

The switching regulator can perform with a high efficiency when a load is relatively heavy. However, the switching regulator decreases in efficiency when the portable equipment is in a standby mode and in a condition when a load is relatively light, for example, in a sleep mode, because the switching regulator itself requires relatively large power consumption.

In background portable equipment, an exchanging mechanism is employed to exchange a control operation mode between a PWM (pulse width modulation) control operation mode and a PFM (pulse frequency modulation) control operation mode at the light load condition so that the power consumption is saved and the efficiency can be kept. However, the response speed to the change of the output voltage may be relatively slow using such background switching regulator. Further, a relatively large noise may be generated at the timing of every abrupt change of the load current.

To improve the switching response, a higher performance circuit working with a higher clock frequency is generally employed. However, the higher performance circuit causes a cost penalty because of a necessity of a complex circuit to drive high speed switches. Further, there may be an upper limit of the clock speed for the circuit.

Other background switching regulators include a series regulator at a last stage of the switching regulator circuit to reduce a deviation of the output voltage. There may also be a cost penalty due to a large circuit size for the installation of the series regulator circuit.

SUMMARY

This patent specification describes a novel step-down switching regulator that converts an input voltage to a predetermined lower voltage than the input voltage for output as an output voltage which includes a first switch, an inductor, a second switch, a controller and a detector to detect a proportional voltage of the output voltage and to output detection results to the controller when the proportional voltage exceeds a first predetermined reference voltage or falls below a second predetermined reference voltage which is lower than the first predetermined reference voltage. The controller shuts the first switch off when the proportional voltage exceeds the first predetermined reference voltage and shuts the second switch off when the proportional voltage falls below the second predetermined reference voltage.

This patent specification further describes a novel step-up switching regulator that converts an input voltage to a predetermined higher voltage than the input voltage for output as an output voltage which includes a first switch, an inductor, a second switch, a controller and a detector to detect a proportional voltage of the output voltage and to output detection results to the controller when the proportional voltage exceeds a first predetermined reference voltage. The controller shuts the first switch off in accordance with a detection signal from the detector.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
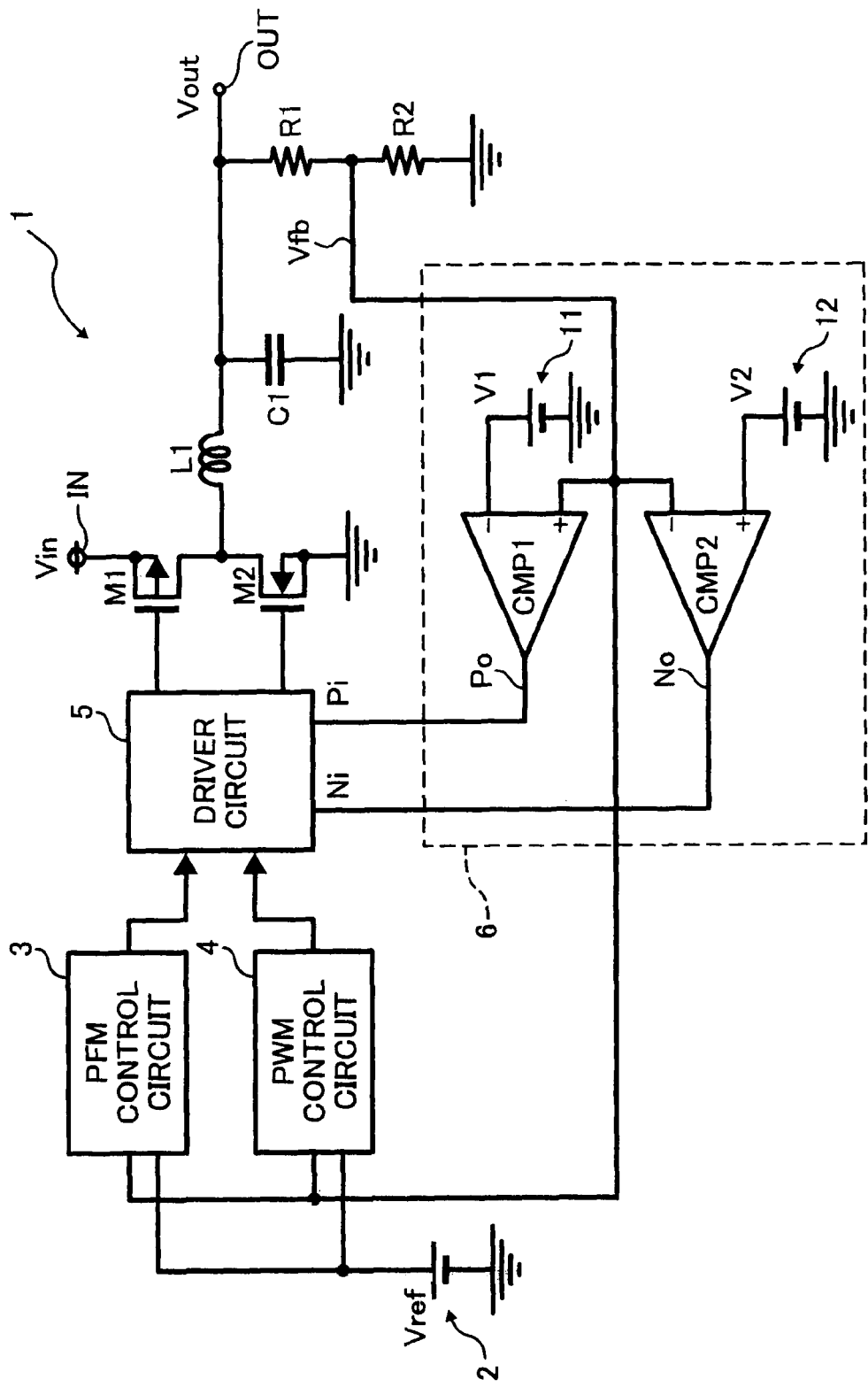
FIG. 1 illustrates a step-down type switching regulator according to a first exemplary embodiment of the disclosure.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, switching regulators according to example embodiments are described.

FIG. 1 illustrates a switching regulator 1 according to a first exemplary embodiment of the disclosure. The switching regulator 1 performs a step-down type switching control in which an input voltage input at an input terminal IN is converted to a predetermined lower voltage and the converted voltage is output from an output terminal OUT. The predetermined lower voltage is lower than the input voltage.

The switching regulator 1 includes a first switching element M1 and a second switching element M2. The first switching element M1 is formed of a PMOS (p-channel metal-oxide silicon) transistor to control an output voltage by switching the first switching element M1. The second switching element M2 is formed of a NMOS (n-channel metal-oxide silicon) transistor to work as a synchronous rectifier.

Further, the switching regulator 1 includes a main reference voltage generation circuit 2, output voltage detection resistors R1 and R2, inductor L1, capacitor C1, a PFM control circuit 3, a PWM control circuit 4, driver circuit 5 and a noise detection circuit 6. The capacitor C1 is a smoothing capacitor for the output voltage.

The first switching element M1 is defined as a first switching element. The second switching element M2 is defined as a second switching element. The main reference voltage generation circuit 2, the output voltage detection resistors R1 and R2, the PFM control circuit 3, the PWM control circuit 4 and the driver circuit 5 form a switching control circuit unit. The noise detection circuit 6 forms a detection circuit.

The main reference voltage generation circuit 2 generates and outputs a predetermined main reference voltage Vref. The output voltage detection resistors R1 and R2, generate and output a partial voltage Vfb by dividing the output voltage Vout. The PFM control circuit 3 controls a frequency of a clock signal and drives the first switching element M1 and second switching element M2 based on a voltage difference between the partial voltage Vfb and the main reference voltage Vref. The PFM control circuit 3 outputs a drive signal to a driver circuit 5.

Similarly, the PWM control circuit 4 controls a width of a clock signal and drives the first switching element M1 and second switching element M2 based on a voltage difference between the partial voltage Vfb and the main reference voltage Vref. The PWM control circuit 4 outputs a drive signal to a driver circuit 5.

Selection of either the PFM control circuit 3 or the PWM control circuit 4 is based on a condition of an output current flowing out from the output terminal OUT. The driver circuit 5 controls the first switching element M1 and the second switching element M2 by making them on or off respectively in accordance with the clock signal output from the PFM control circuit 3 or the PWM control circuit 4.

Signals Po and No are input to the input terminals Pi and Ni of the driver circuit 5. The Signals Po and No are output from the noise detection circuit 6. The first switching element M1 is controlled by the signal Po and the second switching element M2 is controlled by the signal No.

The noise detection circuit 6 includes two comparators CMP1 and CMP2 and first and a second noise reference voltage generators 11 and 12. The first noise reference voltage generator 11 generates a predetermined first reference voltage V1 which is slightly higher than a voltage value Vs of a partial voltage Vfb. The voltage value Vs is a voltage at a regulated state. The second noise reference voltage generator 12 generates a predetermined second reference voltage V2 which is slightly lower than a voltage value Vs of a partial voltage Vfb.

The comparator CMP1 forms a first comparator and the comparator CMP2 forms a second comparator. The partial voltage Vfb is defined as a partial voltage. The reference voltage V1 is defined as a first reference voltage and the reference voltage V2 is defined as a second reference voltage. The output signal Po forms a first signal and the output signal No forms a second signal.

In the comparator CMP1, the first reference voltage V1 is input to an inverted input terminal of the comparator CMP1 and the partial voltage Vfb is input to an non-inverted input terminal of the comparator CMP1. The output terminal is wired to the input terminal Pi of the driver circuit 5.

In the comparator CMP2, similarly, the second reference voltage V2 is input to a non-inverted input terminal of the comparator CMP2 and partial voltage Vfb is input to an inverted input terminal of the comparator CMP2. The output terminal is wired to the input terminal Ni of the driver circuit 5.

Figure 2:
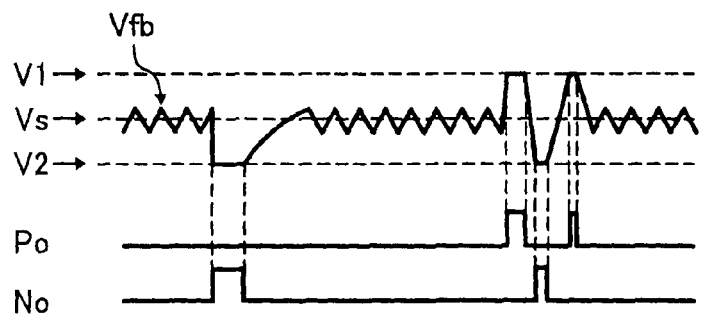
FIG. 2 illustrates waveforms of the switching regulator of FIG. 1.

FIG. 2 illustrates a waveform of the partial voltage Vfb when a noise is superimposed on the output voltage Vout of the switching regulator 1 of FIG. 1. An operation of the switching regulator 1 will be described referring to FIG. 2. A relatively large voltage noise may be generated when the load current is changed when a load capacity is changed abruptly, or when an operation mode is changed abruptly between the PFM control mode and the PWM control mode.

The output voltage Vout is divided by the resistors R1 and R2 to generate the partial voltage Vfb which is proportional to the output voltage. The partial voltage Vfb is compared with the first reference voltage V1 by the comparator CMP1 and is also compared with the second reference voltage V2 by the comparator CMP2.

If the partial voltage Vfb exceeds the first reference voltage V1, the comparator CMP1 outputs a high level signal from the output terminal of the comparator CMP1 to the input terminal Pi of the driver circuit 5. The driver circuit 5 outputs a high level signal to the gate of the first switching element M1 when the high level signal is input to the input terminal Pi so as to shut the first switching element M1 off. As a result, increase of the output voltage is restricted so that the voltage noise is clamped at the first reference voltage V1 as shown in FIG. 2.

If the partial voltage Vfb falls below the second reference voltage V2, the comparator CMP2 outputs a high level signal from the output terminal of the comparator CMP2 to the input terminal Ni of the driver circuit 5. The driver circuit 5 outputs a low level signal to the gate of the second switching element M2 when the low level is input to the input terminal Ni so as to shut the second switching element M2 off. As a result, the decrease of the output voltage is restricted so that the voltage noise is clamped at the reference voltage V2 as shown in FIG. 2.

Thus, if the change of the output voltage Vout is relatively large, the change is detected only by the comparators CMP1 and CMP2 without using the PFM control circuit 3 or the PWM control circuit 4. The first and second switching elements M1 and M2 can be controlled quickly by a feedback of the output voltage because the output signals of the driver circuit 5 are generated through simple and fast circuits. As a result, the switching regulator 1 can respond quickly against the large change of the output voltage.

According to the circuit of FIG. 1, the partial voltage Vfb is input to the non-inverted terminal of the comparators CMP1 and to the inverted terminal of the comparators CMP2. However, another voltage Vp which is proportional to the output voltage Vout can be employed. In such case, the proportional relationship of the first reference voltage V1 and the second reference voltage V2 with respect to the voltages Vp and Vfb are set to have similar relationships, respectively.

The noise detection circuit 6 forms a window comparator which detects a certain voltage range, for example, between two different reference voltages V1 and V2. If the main reference voltage Vref is only employed without using different reference voltages V1 and V2, it may be possible to form a window comparator by installing an offset voltage generation mechanism at each one of the input terminals of the two comparators CMP1 and CMP2 as shown in FIG. 3.

Figure 3:
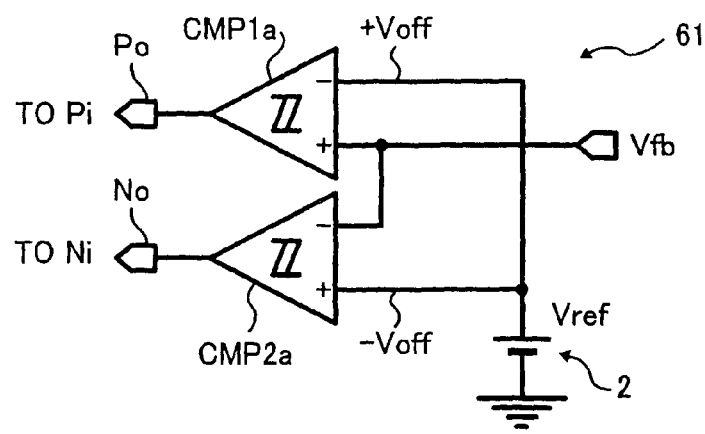
FIG. 3 illustrates an example of a noise detection circuit used in the switching regulator of FIG. 1.

FIG. 3 illustrates an example of another noise detection circuit 61 used in the switching regulator 1. The noise detection circuit 61 includes first and second comparators CMP1a and CMP2a. The partial voltage Vfb is input to the non-inverted input terminal of the first comparator CMP1a and to the inverted input terminal of the second comparator CMP2a. The main reference voltage Vref is input to the inverted input terminal of the first comparator CMP1a and to the non-inverted input terminal of the second comparator CMP2a.

Further, offset voltage generation mechanisms are arranged at the inverted input terminal of the first comparator CMP1a and at the non-inverted terminal of the second comparator CMP2a respectively. A voltage of several tens of millivolts may be set as an offset voltage at the terminals.

Therefore, the first comparator CMP1a outputs a high level only when the partial voltage Vfb exceeds a voltage which is larger than the main reference Vref by the offset voltage. Meanwhile, the second comparator CMP2a outputs a high level only when the partial voltage Vfb falls below a voltage which is smaller than the reference Vref by the offset voltage. Thus, the reference circuits 11 and 12 of FIG. 1 can be eliminated by setting the offset voltage generation mechanisms at the first and second comparators CMP1a and CMP2a.

Figure 4:
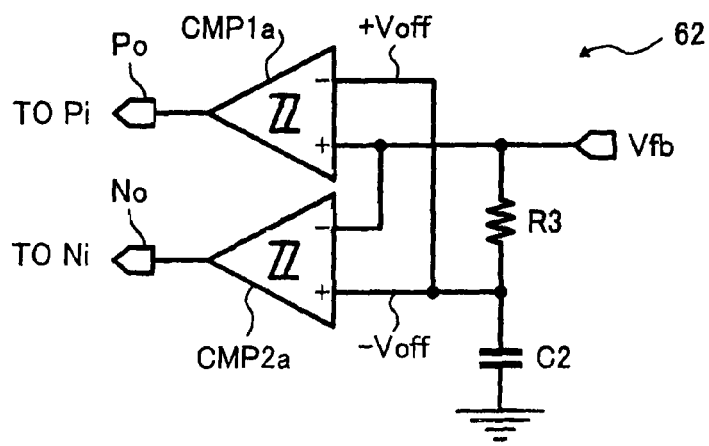
FIG. 4 illustrates another example of the noise detection circuit.

FIG. 4 illustrates another noise detection circuit 62 used in the switching regulator 1. The noise detection circuit 62 includes the first and second comparators CMP1a and CMP2a, a resistor R3 and the capacitor C2. The partial voltage Vfb is input to the non-inverted input terminal of the first comparator CMP1a and to the inverted input terminal of the second comparator CMP2a. The reference voltage Vref is input to the inverted input terminal of the first comparator CMP1a and to the non-inverted input terminal of the second comparator CMP2a.

The partial voltage Vfb is also input to the inverted input terminal of the first comparator CMP1a and to the non-inverted input terminal of the second comparator CMP2a through the resistor R3. Further, the inverted input terminal of the first comparator CMP1a and the non-inverted input terminal of the second comparator CMP2a are wired to ground through the capacitor C2. Furthermore, offset voltage generation mechanisms are arranged at the inverted input terminal of the first comparator CMP1a and at the non-inverted terminal of the second comparator CMP2a.

The resistor R3 and the capacitor C2 form a lowpass-filter circuit. Normally, each voltage at the inverted input terminal of CMP1a and the non-inverted input terminal of the second comparator CMP2a is equal to the partial voltage Vfb.

When the output voltage Vout is changed abruptly, the partial voltage Vfb can respond immediately to the change of the output voltage Vout through the detection resistor. However, the voltage at the inverted input terminal of CMP1a and the voltage at the non-inverted input terminal of the second comparator CMP2a may not respond immediately to the change of the output voltage Vout. As a result, there may be a voltage difference between the inverted input terminal of the first comparator CMP1a and the non-inverted input terminal of the second comparator CMP2a.

If the voltage difference exceeds the offset voltage Voff, the first comparator CMP1a or the second comparator CMP2a outputs a high level signal and shuts the first switching element M1 off or the second switching element M2 off. Then, noise on the output voltage Vout is avoided.

This circuit configuration of FIG. 4 makes circuit design of the switching regulator more flexible because the voltage input to the non-inverted terminal of the comparators CMP1 and to the inverted terminal of the comparators CMP2 can be determined to be another voltage than the partial voltage Vfb, which is a voltage proportional to the output voltage Vout.

Figure 5:
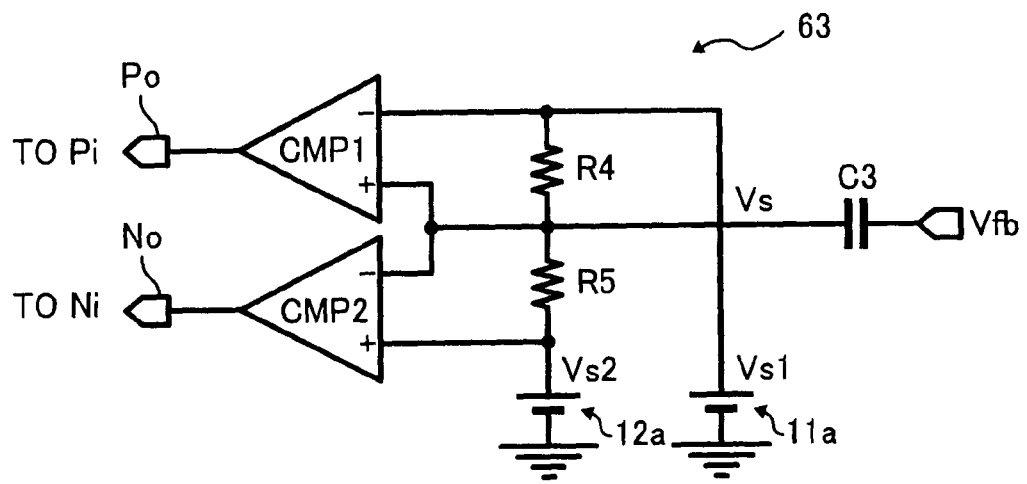
FIG. 5 illustrates another example of the noise detection circuit.

FIG. 5 illustrates another noise detection circuit 63 used in the switching regulator 1. The noise detection circuit 63 includes the first and second comparators CMP1a and CMP2a, resistors R4 and R5, a capacitor C3, and first and second reference voltage generation circuits 11a and 12a. The partial voltage Vfb is input to the non-inverted input terminal of the first comparator CMP1a and to the inverted input terminal of the second comparator CMP2a through the capacitor C3.

A predetermined first reference voltage Vs1 is input to the inverted input terminal of the first comparator CMP1 from the first reference voltage generation circuit 11a. The first reference voltage Vs1 is input to the non-inverted input terminal of the first comparator CMP1 through the resistor R4. A predetermined second reference voltage Vs2 is input to the non-inverted input terminal of the second comparator CMP2 from the second reference voltage generation circuit 12a. The second reference voltage Vs2 is input to the inverted input terminal of the second comparator CMP2 through the resistor R5.

The first reference voltage Vs1 is set to be larger than the voltage Vs2 to have a voltage difference. A voltage at the non-inverted input terminal of the first comparator CMP1, which is the voltage of the inverted input terminal of the second comparator CMP2, is an intermediate voltage Vsm between the first reference voltage Vs1 and the second reference voltage Vs2.

Capacitor C3 and resistor R4 and capacitor C3 and resistor R5 form a high-pass-filter circuit. A signal from the output voltage Vout is input to the non-inverted input terminal of the first comparator CMP1 and to inverted input terminal of the second comparator CMP2 when the partial voltage Vfb is changed abruptly in response to an abrupt change of the output voltage Vout.

If an increased amount of the voltage change of the partial voltage Vfb exceeds a voltage, which is expressed by the formula (Vs1−Vsm), the first comparator CMP1 outputs a high level signal. If a decreased amount of the voltage change of the partial voltage Vfb falls below a voltage, which is expressed by the formula (Vsm−Vs2), the second comparator CMP2 outputs a high level signal.

Thus, the noise of the output voltage Vout is eliminated by turning switching element 1 off or switching element 2 off. Generally, it is possible to use a smaller capacitor C3 when the high-pass-filter is used in comparison to a circuit using a low-pass-filter circuit. The voltage difference between the first and second reference voltages Vs1 and Vs2 is important in this type of circuit. However, it may not be important to have an accurate value of voltage itself. As a result, the manufacturing may be easier.

Figure 6:
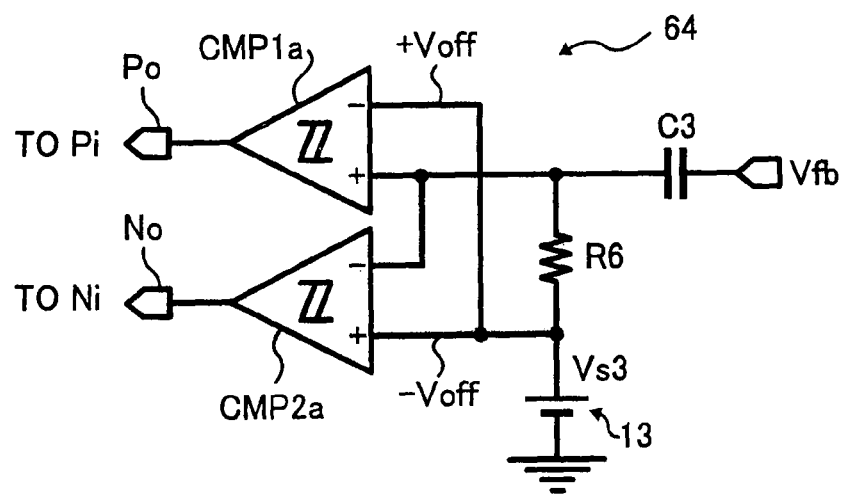
FIG. 6 illustrates another example of the noise detection circuit.

FIG. 6 illustrates another noise detection circuit 64 used in the switching regulator 1. The noise detection circuit 64 includes the first and second comparators CMP1a and CMP2a, a resistor R6, a capacitor C3, and a third reference voltage generation circuit 13. The partial voltage Vfb is input to the non-inverted input terminal of the first comparator CMP1a and to the inverted input terminal of the second comparator CMP2a through the capacitor C3.

The third reference voltage Vs3 is input to the inverted input terminal of the first comparator CMP1a and to the non-inverted input terminal of the second comparator CMP2a. The resistor R6 is connected between the non-inverted input terminal of the first comparator CMP1a and the non-inverted input terminal of the second comparator CMP2a. Further, offset voltage generation mechanisms are arranged at the inverted input terminal of the first comparator CMP1a and at the non-inverted terminal of the second comparator CMP2a similar to FIGS. 3 and 4.

Capacitor C3 and resistor R6 form a high-pass-filter circuit. A signal from the output voltage Vout is input to the non-inverted input terminal of the first comparator CMP1 and to the inverted input terminal of the second comparator CMP2 when the partial voltage Vfb is changed abruptly in response to an abrupt change of the output voltage Vout.

If the changed amount of the output voltage Vout is larger than the offset voltage Voff, the first comparator CMP1a or the second comparator CMP2a outputs a high level signal. It is possible to eliminate the noise of the output voltage Vout by turning the switching element 1 off or the switching element 2 off.

Thus, by employing the high-pass filter circuit and the offset voltage generation mechanisms, it is possible to reduce the size of the reference voltage generation circuit and to have similar effects of circuit of FIG. 5.

As described, according to the first embodiment of the disclosure, if the change of the output voltage Vout is relatively large, the change is detected only by the first and second comparators CMP1 and CMP2 without using the PFM control circuit 3, or the PWM control circuit 4. The first and second switching elements M1 and M2 are controlled by the driver circuit 5 which receives control signals from the first and second comparators CMP1 and CMP2. Therefore, the switching regulator 1 can respond quickly to the large changes of the output voltage Vout. Further, the switching regulator 1 can be achieved with a simple and cost effective circuit.

The technology described above can be applied to a step-up type switching regulator.

Figure 7:
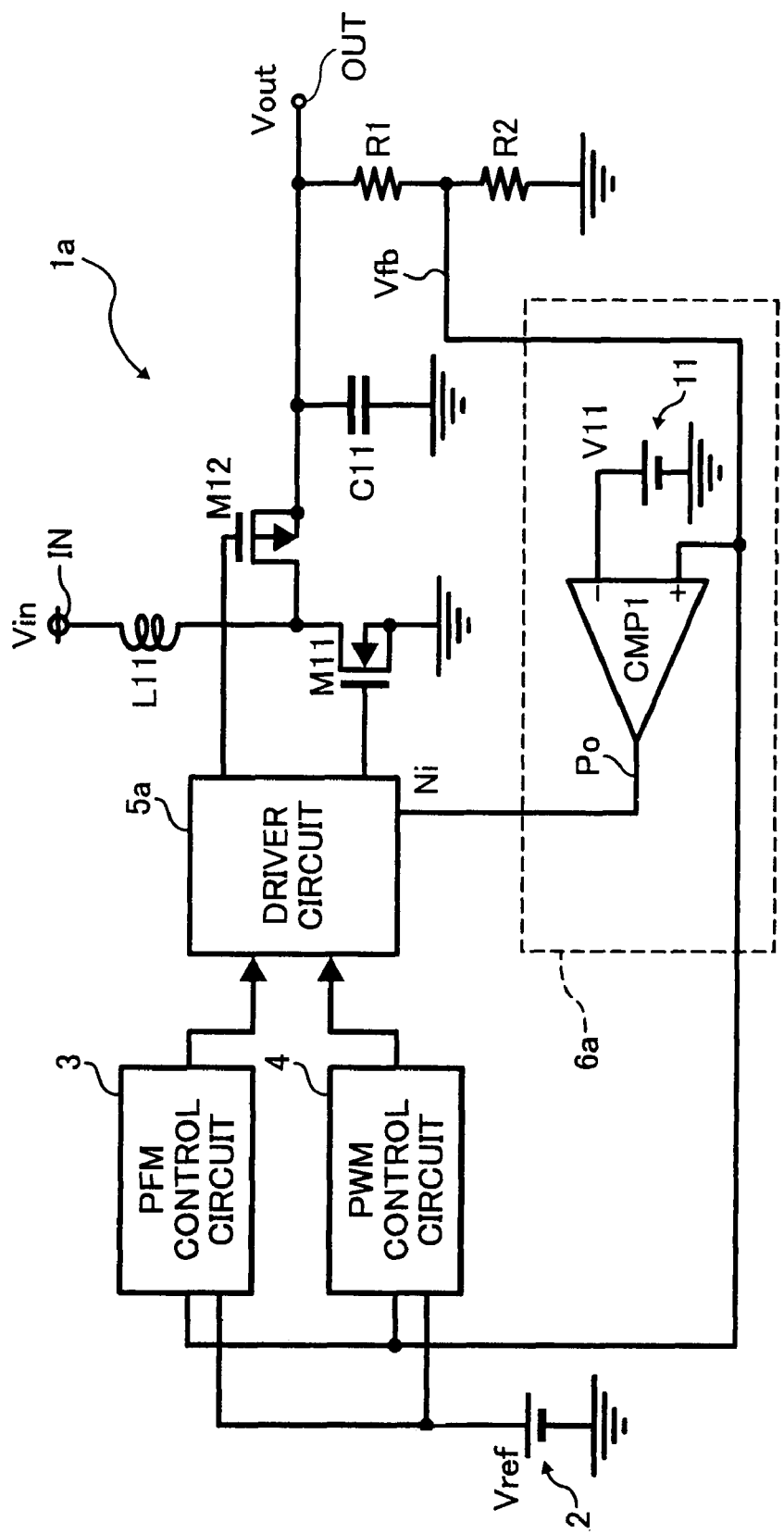
FIG. 7 illustrates a step-up type switching regulator according to a second exemplary embodiment of the disclosure.

FIG. 7 illustrates a step-up type switching regulator 1a according to a second exemplary embodiment of the disclosure. The switching regulator 1a performs a step-up type switching control in which an input voltage input at an input terminal IN is converted to a predetermined higher voltage and a converted voltage is output from an output terminal OUT. The predetermined higher voltage is higher than the input voltage.

The switching regulator 1a has a similar circuit configuration as the switching regulator 1 of FIG. 1. However, the switching regulator 1a includes a first comparator CMP1 only and does not includes a second comparator.

Further, the switching regulator 1a includes a step-up circuit configuration with a first switching element M11, a second switching element M12, an inductor L11, a drive circuit 5a and a noise detection circuit 6a. The driver circuit 5a only controls the first switching element M11 by turning on or off CMP1 in accordance with the output signal of the first comparator.

In FIG. 7, the switching regulator 1a converts an input voltage Vin input from an input terminal IN to a predetermined higher voltage which is higher than the input voltage Vin and outputs an output voltage Vout from an output terminal OUT. The switching regulator 1a includes the first and second switching elements M11 and M12. The switching element M11 is formed of a NMOS transistor to perform as a switch to control the output voltage. The switching element M12 is formed of a PMOS transistor to perform as a synchronous rectifier.

Similar to the step-down type switching regulator 1 of FIG. 1, the switching regulator 1a includes a main reference voltage generation circuit 2, output voltage detection resistors R1 and R2, inductor L11, capacitor C11, a PFM control circuit 3, a PWM control circuit 4, a driver circuit 5a, and a noise detection circuit 6a. The capacitor C11 is a smoothing capacitor for the output voltage Vout.

The first switching element M11 is defined as a first switching element. The second switching element M12 is defined as a second switching element. The main reference voltage generation circuit 2, the output voltage detection resistors R1 and R2, the PFM control circuit 3, the PWM control circuit 4, and the driver circuit 5a form a switching control circuit unit. The noise detection circuit 6a forms a detection circuit.

The driver circuit 5a performs an on/off control for the first and second switching elements M11 and M12 based on the clock signal output from the PFM control circuit 3 or the PWM control circuit 4.

An output signal Po from the noise detection circuit 6a is input to the input terminal Ni of the driver circuit 5a. The first switching element M11 is controlled to be on or off by the output signal Po. The noise detection circuit 6a includes the first comparator CMP1 and the reference voltage generation circuit 11.

In the first comparator CMP1, a reference voltage V11 is input to the inverted input terminal and the partial voltage Vfb is input to the non-inverted input terminal. The output terminal is wired to input terminal Ni of the driver circuit 5a.

Figure 8:
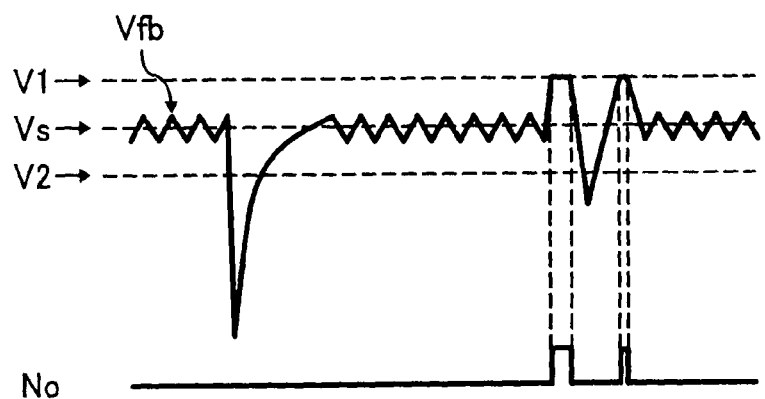
FIG. 8 illustrates waveforms of the switching regulator of FIG. 7.

FIG. 8 illustrates a waveform of the partial voltage Vfb when a noise is superimposed on the output voltage Vout of the switching regulator 1a of FIG. 7. An operation of the switching regulator 1a will be described referring to FIG. 8.

Figure 9:
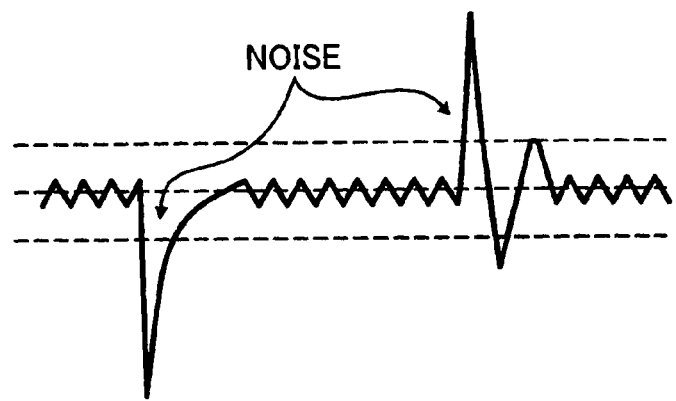
FIG. 9 illustrates a waveform of the output voltage showing noises.

FIG. 9 illustrates a waveform of the output voltage Vout. As shown in FIG. 9, a relatively large voltage noise may be added on the output voltage Vout when the load current is changed, when a load capacity is changed abruptly, or when an operation mode is changed between the PFM control and the PWM control.

The output voltage Vout is divided by resistors R1 and R2 and is detected as the partial voltage Vfb, which is proportional to the output voltage Vout. The partial voltage Vfb is compared with the reference voltage V11 by the comparator CMP1.

If the partial voltage Vfb exceeds the reference voltage V11, comparator CMP1 outputs a high level signal from the output terminal Po of the comparator CMP1 to the input terminal Ni of the driver circuit 5a. The driver circuit 5a outputs a low level signal to the gate of the first switching element M11 when the high level signal is input to the input terminal Ni so as to shut the first switching element M11 off. As a result, an increase of the output voltage is restricted so that the voltage noise is clamped at the reference voltage V11 as shown in FIG. 8.

If one of the noise detection circuits 61, 62 and 64 of FIGS. 3, 4 and 6 is used as an element circuit of the noise detection circuit 6a of FIG. 7, the second comparator CMP2a is to be removed and the output signal Po of the comparator CMP1 is input to input terminal Ni of the driver circuit 5a of FIG. 7. Similarly, if the circuit components of the noise detection circuit 63 of FIG. 5 are used as the noise detection circuit 6a of FIG. 7, the second comparator CMP2 is to be removed and the output signal Po of the comparator CMP1 is input to input terminal Ni of the driver circuit 5a of FIG. 7.

With the switching regulator according to the second embodiment of the disclosure, if the changes of the output voltage Vout are relatively large, the changes are detected only by the comparator CMP1 without using the PFM control circuit 3 or the PWM control circuit 4. The first switching elements M11 are controlled by the driver circuit 5a which receives the control signal from the first comparator CMP1. Therefore, the switching regulator 1a can respond quickly to large changes of the output voltage Vout. Further, the switching regulator 1a can be achieved with a simple and cost effective circuit.

In the switching regulator 1a according to the second embodiment of the disclosure, the partial voltage Vfb is input to the non-inverted input terminal of comparator CMP1.

However, another voltage Vp which is proportional to the output voltage Vout can be used. In this case, proportional relations of the reference voltage V11 with respect to the voltages Vp and Vfb are set to have similar relationship.

Numerous additional modifications and variations are possible in light of the above teachings. It is therefore to be understood that within the scope of the appended claims, the disclosure of this patent specification may be practiced otherwise than as specifically described herein.

What is claimed is:

1. A step-down switching regulator comprising:
   a first switch configured to switch in accordance with a first control signal;
   an inductor configured to store charge from an input voltage based on the first switch;
   a second switch configured to discharge the charge stored in the inductor in accordance with a second control signal;
   a controller configured to generate a proportional voltage based on an output voltage and to control the first and second switches so as to make the proportional voltage similar to a predetermined main reference voltage;
   a PWM control circuit and a PFM control circuit, each being connected to the controller so that both the PWM and PFM control circuits can direct the controller to drive both the first and second switches; and
   a detector configured to detect a change of the proportional voltage and output detection results to the controller when the proportional voltage exceeds a first predetermined reference voltage, or falls below a second predetermined reference voltage that is lower than the first predetermined reference voltage,
   wherein activation and deactivation of the first and second switches is based solely on outputs of the detector, such that the controller shuts the first switch off when the proportional voltage exceeds the first predetermined reference voltage and shuts the second switch off when the proportional voltage falls below the second predetermined reference voltage, and wherein
   the detector further includes:
   a first comparator configured to output a predetermined first signal to the controller when the proportional voltage exceeds the first predetermined reference voltage and activation and deactivation of the first switch is based solely on the output of the first comparator;
   a second comparator configured to output a predetermined second signal to the controller when the proportional voltage falls below the second predetermined reference voltage and activation and deactivation of the second switch is based solely on the output of the second comparator;
   resistors connected between an input terminals of the first comparators and an input terminal of the second comparator; and
   a high-pass filter formed of a capacitor and the resistors and wired to a connecting node of the resistors to input a signal based on the proportional voltage, and wherein:
   the connecting node of the resistors is wired to input terminal of the first and second comparator;
   a first voltage is input to an input terminal of the first comparator and a second voltage which is lower than the first voltage is input to an input terminal of the second comparator; and
   an intermediate voltage between the first and second voltages is input to other input terminals of the first and second comparators by adding the proportional voltage through the high-pass filter.

2. The switching regulator of claim 1, further including:
   a PWM control circuit and a PFM control circuit, each having as inputs the predetermined main reference voltage and the proportional voltage, and each being connected to the controller, wherein the controller is operable to select between PWM control and PFM control depending on a value of an output current of the step-down switching regulator.

3. The switching regulator of claim 1, wherein: the first and second comparators form a window comparator that detects a predetermined voltage range.

4. The switching regulator of claim 1, wherein:
   the first and second comparators include first and second offset generation mechanisms arranged at corresponding input terminals that generate first and second offset voltages respectively;
   a first voltage is input to one input terminal of the first comparator by superimposing the first offset voltage on a third predetermined voltage and the proportional voltage is input to another input terminal of the first comparator; and
   a second voltage is input to one input terminal of the second comparator by superimposing the second offset voltage on the third predetermined voltage and the proportional voltage is input to another input terminal of the second comparator.

5. The switching regulator of claim 4, wherein: the third predetermined voltage is the predetermined main reference voltage.

6. The switching regulator of claim 1, wherein:
   the detector further includes a low-pass filter formed of a capacitor and a resistor;
   the first and second comparators include first and second offset generation mechanisms arranged at corresponding input terminals which generate first and second offset voltages respectively;
   a first voltage is input to one input terminal of the first comparator through the low-pass filter by superimposing the first offset voltage on the proportional voltage and the proportional voltage is input directly to another input terminal of the first comparator; and
   a second voltage is input to one input terminal of the second comparator through the low-pass filter by superimposing the second offset voltage on the proportional voltage and the proportional voltage is input directly to another input terminal of the second comparator.

7. A step-down switching regulator comprising:
   a first switch configured to switch in accordance with a first control signal;
   an inductor configured to store charge from an input voltage based on the first switch;
   a second switch configured to discharge the charge stored in the inductor in accordance with a second control signal;
   a controller configured to generate a proportional voltage based on an output voltage and to control the first and second switches so as to make the proportional voltage similar to a predetermined main reference voltage;
   a PWM control circuit and a PFM control circuit, each being connected to the controller so that both the PWM and PFM control circuits can direct the controller to drive both the first and second switches; and
   a detector configured to detect a change of the proportional voltage and output detection results to the controller when the proportional voltage exceeds a first predetermined reference voltage, or falls below a second predetermined reference voltage that is lower than the first predetermined reference voltage, wherein activation and deactivation of the first and second switches is based solely on outputs of the detector, such that the controller shuts the first switch off when the proportional voltage exceeds the first predetermined reference voltage and shuts the second switch off when the proportional voltage falls below the second predetermined reference voltage, and wherein the detector further includes:

a first comparator configured to output a predetermined first signal to the controller when the proportional voltage exceeds the first predetermined reference voltage and activation and deactivation of the first switch is based solely on the output of the first comparator;

a second comparator configured to output a predetermined second signal to the controller when the proportional voltage falls below the second predetermined reference voltage and activation and deactivation of the second switch is based solely on the output of the second comparator;

a resistor connected between an input terminal of the first comparator and an input terminal of the second comparator;

a high-pass filter formed of a capacitor and the resistor and wired to an input terminal of the first comparator;

a third voltage connected between an input terminal of the second comparator and ground; and the first and second comparators include first and second offset generation mechanisms arranged at corresponding input terminals which generate first and second offset voltages respectively, a first voltage is input to an input terminal of the first comparator by superimposing the first offset voltage on the third voltage and the proportional voltage is input to another input terminal of the first comparator through the high-pass filter, and a second voltage is input to an input terminal of the second comparator by superimposing the second offset voltage on the third voltage and the proportional voltage is input to another input terminal of the second comparator through the high-pass filter.

8. A step-up switching regulator comprising:

a first switch configured to switch in accordance with a first control signal;

an inductor configured to store charge from an input voltage based on the first switch;

a second switch configured to discharge the charge stored in the inductor in accordance with a second control signal;

a controller configured to generate a proportional voltage based on an output voltage and to control the first and second switches so as to make the proportional voltage similar to a predetermined main reference voltage; and a detector configured to detect the proportional voltage and output detection results to the controller when the proportional voltage exceeds a first predetermined reference voltage, wherein activation and deactivation of the first switch is based solely on outputs of the detector, such that the controller shuts the first switch off in accordance with a detection signal from the detector, wherein the inductor is connected to first terminals of the first and second switches and an input voltage and the proportional voltage is output to the detector at a second terminal of the second switch, wherein the detector further includes:

a comparator configured to output a predetermined first signal to the controller when the proportional voltage exceeds the first predetermined reference voltage and activation and deactivation of the first switch is based solely on the output of the first comparator;

a resistor connected between input terminals of the comparator, and high-pass filter formed of a capacitor and the resistor and wired to an input terminal of the comparator, and a first voltage is input to an input terminal of the comparator and the proportional voltage is input to another input terminal of the comparator.

9. The switching regulator of claim 8, wherein:

the detector further includes:

a resistor connected between one of the input terminals of the comparator and a third voltage, a high-pass filter formed of a capacitor and the resistor and wired to an input terminal of the comparator, and an offset generation mechanism arranged at an input terminal which generates an offset voltage, and wherein a first voltage is input to one input terminal of the comparator by superimposing the offset voltage on the third voltage and the proportional voltage is input to another input terminal of the comparator through the high-pass filter.

10. The switching regulator of claim 8, wherein:

the controller shuts the first switch off when the proportional voltage exceeds the first predetermined reference voltage.

11. The switching regulator of claim 8, wherein:

a PWM control circuit and a PFM control circuit, each having as inputs the predetermined main reference voltage and the proportional voltage, and each being connected to the controller, wherein the controller is operable to select between PWM control and PFM control depending on a value of an output current of the step-up switching regulator.

12. The switching regulator of claim 8, wherein:

the comparator includes an offset generation mechanism arranged at an input terminals which generates an offset voltage, and a first voltage is input to one input terminal of the comparator by superimposing the offset voltage on a second predetermined voltage and the proportional voltage is input to another input terminal of the comparator.

13. The switching regulator of claim 12, wherein: the second predetermined voltage is the predetermined main reference voltage.

14. The switching regulator of claim 8, wherein:

the detector further includes a low-pass filter formed of a capacitor and a resistor, the comparator includes an offset generation mechanism arranged at an input terminal which generates an offset voltage, and;

a first voltage is input to the one input terminal of the comparator through the low-pass filter by superimposing the offset voltage on the proportional voltage and the proportional voltage is input directly to another input terminal of the comparator.

* * * * *